(12) United States Patent
Wagner et al.

(10) Patent No.: US 7,346,407 B2
(45) Date of Patent: Mar. 18, 2008

(54) METHOD OF OPERATING AN ADVANCED PROCESS CONTROLLER BY DYNAMICALLY ADAPTING HIERARCHY LEVELS

(75) Inventors: Heiko Wagner, Dresden (DE); Jan Raebiger, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 91 days.

(21) Appl. No.: 11/248,562

(22) Filed: Oct. 12, 2005

(65) Prior Publication Data

US 2006/0195213 A1 Aug. 31, 2006

(30) Foreign Application Priority Data

Feb. 28, 2005 (DE) ............... 10 2005 009 026

(51) Int. Cl.
*G06F 19/00* (2006.01)
(52) U.S. Cl. .......................... 700/97; 706/45
(58) Field of Classification Search ............ 700/47–51, 700/108–109, 169, 29, 121, 97; 706/45–47
See application file for complete search history.

(56) References Cited

U.S. PATENT DOCUMENTS

| 5,161,110 | A | * | 11/1992 | Dorchak ..................... 700/108 |
| 5,448,722 | A | * | 9/1995 | Lynne et al. .................. 706/49 |
| 5,691,895 | A | * | 11/1997 | Kurtzberg et al. ............ 700/29 |
| 6,507,766 | B2 | * | 1/2003 | Khan ......................... 700/109 |
| 6,607,926 | B1 | * | 8/2003 | Toprac et al. ................. 438/7 |
| 6,718,533 | B1 | * | 4/2004 | Schneider et al. .......... 717/100 |
| 6,728,587 | B2 | * | 4/2004 | Goldman et al. ........... 700/108 |
| 7,047,099 | B2 | * | 5/2006 | Shanmugasundram et al. ......................... 700/121 |
| 7,123,978 | B2 | * | 10/2006 | Hartman et al. ............ 700/108 |
| 2003/0220709 | A1 | * | 11/2003 | Hartman et al. ............ 700/121 |
| 2006/0036345 | A1 | * | 2/2006 | Cao et al. .................. 700/108 |

FOREIGN PATENT DOCUMENTS

WO   WO 2004/074952 A2   9/2004

OTHER PUBLICATIONS

"A multi-layer/multi-level control architecture for computer integrated manufacturing systems", Albert Jones, National Institute of Standards and Technology, 1989 IEEE.*
"Hierarchical flow control: A framework for scheduling and planning discrete events in manufacturing systems", Stanley B. Gershwin, 1989 IEEE.*
"Hierarchical real-time scheduling of a semiconductor fabrication facility", Xiewei Bai et al., 1990 IEEE.*
Kunz et al., "Understanding the behaviour of distributed applications through reverse engineering", IOP Publishing Ltd, 1994.*

(Continued)

*Primary Examiner*—Leo Picard
*Assistant Examiner*—Carlos Ortiz-Rodriguez
(74) *Attorney, Agent, or Firm*—Williams, Morgan & Amerson, P.C.

(57) ABSTRACT

By providing a detailed hierarchical structure for an APC algorithm and by dynamically adapting a hierarchical level in this structure, an efficient utilization of controller data is ensured, while at the same time a large number of process conditions may be taken into consideration without requiring a re-design of the hierarchical structure.

6 Claims, 2 Drawing Sheets

OTHER PUBLICATIONS

"ANSI/ISA S88 Batch Standard, A general overview", ISA Philadelphia Section 20, Feb. 2002.*

"Batch Automation: Make S88 Work For You", Chemical Engineering, Aug. 2003.*

Scholten et al., "White Paper, S88 for Engineers", World Batch Forum, 2004.*

Sarfaty et al., "Advance Process Control Solutions for Semiconductor Manufacturing," 2002 IEEE/SEMI Advanced Semiconductor Manufacturing Conference, pp. 101-106.

* cited by examiner

METHOD OF OPERATING AN ADVANCED PROCESS CONTROLLER BY DYNAMICALLY ADAPTING HIERARCHY LEVELS

BACKGROUND OF THE INVENTION

1. Field of the Invention

The present invention relates to the field of fabricating semiconductor devices, and, in particular, to advanced process control (APC) techniques for manufacturing processes, wherein an improved process control quality is achieved by adjusting process parameters on the basis of a process model, measurement data and information related to, for example, the product, the type of process, the process tool to be used and the like.

2. Description of the Related Art

Today's global market forces manufacturers of mass products to offer high quality products at a low price. It is thus important to improve yield and process efficiency to minimize production costs. This holds especially true in the field of semiconductor fabrication, since, here, it is essential to combine cutting-edge technology with mass production techniques. It is, therefore, the goal of semiconductor manufacturers to reduce the consumption of raw materials and consumables while at the same time improve process tool utilization. The latter aspect is especially important, since in modern semiconductor facilities, equipment is required which is extremely cost-intensive and represents the dominant part of the total production costs. For example, in manufacturing modern integrated circuits, five hundred or more individual processes may be necessary to complete the integrated circuit, wherein failure in a single process step may result in a loss of the complete integrated circuit. This problem is even exacerbated in that the size of the substrate (on which a plurality of such integrated circuits are processed) steadily increases, so that failure in a single process step may entail the loss of a large number of products.

Therefore, the various manufacturing stages have to be thoroughly monitored to avoid undue waste of tool operation time and raw materials. Ideally, the effect of each individual process step on each substrate would be detected by measurement and the substrate under consideration would be released for further processing only if the required specifications were met. A corresponding process control, however, is not practical, since measuring the effects of certain processes may require relatively long measurement times or may even necessitate the destruction of the sample. Moreover, immense effort, in terms of time and equipment, would have to be made on the metrology side to provide the required measurement results. Additionally, utilization of the process tool would be minimized since the tool would be released only after the provision of the measurement result and its assessment.

The introduction of statistical methods, e.g., mean values, etc., for adjusting process parameters, significantly relaxes the above problem and allows a moderate utilization of the process tools while attaining a relatively high product yield. Nevertheless, in total, a large number of dummy substrates or pilot substrates may be necessary to adjust process parameters of respective process tools, wherein tolerable parameter drifts during the process have to be taken into consideration when designing a process sequence, since such parameter drifts may remain undetected over a long time period or may not be compensated for efficiently.

Recently, a process control strategy has been introduced and is continuously improved, allowing a high degree of process control, desirably on a run-to-run basis, with a moderate amount of measurement data. In this control strategy, the so-called advanced process control, a model of a process or of a group of interrelated processes is established and implemented in an appropriately configured process controller. The process controller also receives information including pre-process measurement data and/or post-process measurement data, as well as information related, for instance, to the substrate history, such as type of process or processes, the product type, the process tool or process tools in which the products are to be processed or have been processed in previous steps, the process recipe to be used, i.e., a set of required sub-steps for the process or processes under consideration, wherein possibly fixed process parameters and variable process parameters may be contained, and the like. From this information and the process model, the process controller determines a controller state or process state that describes the effect of the process or processes under consideration on the specific product, thereby permitting the establishment of an appropriate parameter setting of the variable parameters of the specified process recipe to be performed with the substrate under consideration.

In complex APC algorithms, the measurement data contained in the information supplied to the APC algorithm, which may represent feedback and/or feed forward information, is frequently organized in the form of a hierarchical structure. That is, based on the measurement data and any additional information, such as information on an upstream operation, the type of product, previously used process tools, and the like, which may have an influence on the result of the process to be controlled, and on the basis of a respective process model, the APC algorithm determines the parameter setting to be used in the current process. Due to the various influences, such as the upstream operation, the product type, and the like, the information supplied to the APC algorithm is "clustered" or organized in accordance with the hierarchical structure with the intention to use that information supplied to the APC algorithm such that it fits best the current process situation or condition of the process tool to be controlled.

With reference to FIGS. 1a-1b, an exemplary APC architecture may be described in more detail, wherein a hierarchical approach is used to appropriately cluster the data supplied to the APC algorithm.

In FIG. 1a, a typical portion of a manufacturing environment 100 is schematically illustrated, wherein the environment 100 is configured to form resist features on semiconductor devices in a controlled fashion. For instance, the environment 100 may represent a manufacturing sequence required for establishing resist features for the formation of gate electrodes of transistor devices in advanced semiconductor devices. The environment 100 comprises a first photolithography tool S1, which is also referred to as a stepper, and a second photolithography tool S2, which are to be controlled by an APC algorithm implemented in a correspondingly configured controller 110. Moreover, a first and a second process tool for applying a photoresist on a substrate, referred to as P1 and P2, are provided and may represent upstream process tools, the operation of which may influence the performance of the steppers S1 and S2. Moreover, two different types of substrates, indicated as type A and type B, may be introduced into the environment 100 as a group of substrates, as individual substrates, and the like. Moreover, a metrology tool 120, for instance an optical instrument for estimating a line width of resist features, is provided and is operatively connected to the controller 110 to provide measurement results. Thus, the controller 110 and the metrology tool 120 establish a feedback control loop, in which current tool parameter settings for the steppers S1 and S2 are calculated on the basis of previously processed substrates. The controller 110 is further configured to receive additional information regarding the type of substrate, the process tools used, and reticles R1, R2 which may be used in the steppers S1 and S2.

During a typical manufacturing sequence in the environment 100, substrates A and B are processed in the resist coating tools P1 and P2 in conformity with process requirements as dictated by tool availability and the like. Thereafter, the substrates arrive at the steppers S1 and S2, the parameter settings of which are determined by an overall process recipe, wherein the specific settings of any variable parameters, such as exposure dose and the like, are provided by the controller 110, which calculates, for instance, an appropriate exposure dose on the basis of the measurement results of previously processed substrates and the tool-specific information. When configuring the controller 110, a hierarchical structure of the information supplied thereto may be established, for instance on the basis of experiments, theoretical models, experience and the like. For instance, for the APC algorithm of the controller 110, four items of relevance may have been identified for which the following hierarchy structure may have been established: first level— upstream entity, that is, the resist coating tools P1 and P2; second level—current entity, that is, the steppers S1 and S2; third level—product type, that is substrates of the type A and B; and fourth level—reticles R1 and R2 used in the steppers S1 and S2.

FIG. 1b schematically shows in a more convenient fashion a respective hierarchical structure 130 including four hierarchy levels L1, L2, L3, L4 corresponding to the levels defined above. Hence, when the APC controller 110 is operating on the fourth hierarchy level, there are sixteen different "types" of controller data that have to be taken into consideration when calculating the respective parameter settings for the steppers S1 and S2. In other words, the controller 110 may treat the measurement data obtained from the tool 120 differently for the sixteen end points of the hierarchical structure shown in FIG. 1b so as to take into consideration the various process "situations" represented by the end points of the tree structure 130. Thus, during the processing of a plurality of substrates A and B in the environment 100, an increasing amount of metrology data is created, which is grouped or clustered into respective "buckets" corresponding to the hierarchical structure 130. That is, new substrates of the types A and B to be processed will receive the process settings, which are calculated by using only data from previously processed substrates that had the same values for all hierarchical levels L1, L2, L3, L4. When a change in one of the hierarchical levels occurs, for instance if a new reticle is introduced into the environment 100, then initial process settings for the steppers S1 and S2 with respect to the new reticle may be derived from corresponding "buckets" of the third hierarchy level. That is, the initial parameter settings for the new reticle may be obtained from substrates belonging to the same "bucket" or process situation without considering the fourth hierarchy level. This conventional hierarchical approach may, however, suffer from certain inefficiencies in the following cases.

First, during development and setup of a process sequence, a certain hierarchy level may have been identified to be relevant but the significance of the level in a later stage may drastically decrease. In other situations, a level may be considered relevant only under rare, not yet fully understood, conditions but is included into the hierarchy structure to accommodate these rare cases. In the former situation as well as in the latter situation, corresponding controller data, which are based on "precious" measurement data, are divided into different buckets corresponding to the respective hierarchy levels, wherein in most situations this further subdividing of "precious" measurement data is not necessary, thereby decreasing the efficiency of the respective APC algorithm, since the measurement data are "diluted," that is, the data per thread and time unit decreases. Moreover, multiple initializations may occur and not all available information is then used for a calculation of the new process settings.

Second, a level may have been considered to be relevant under rare, not yet fully understood conditions, but is not included into the hierarchy in order to prevent the adverse effects explained above. In this situation, conditions may occur under which the hierarchy structure neglects the influence of certain process items and data may then be combined that does not fit to the corresponding situation, thereby degrading the performance of the APC algorithm. In conventional approaches, corresponding situations described above may typically be circumvented by changing the hierarchy configuration, once corresponding changes have been detected. However, a corresponding change of the hierarchy configuration is accompanied by a significant delay and also requires significant changes in the software.

In view of the problems identified above, there is a need for an enhanced technique in adapting APC algorithms while avoiding or at least reducing the effects of one or more of the problems described above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to an enhanced technique of controlling process tools by means of advanced process control (APC) algorithms, in which enhanced control efficiency may be accomplished by dynamically adapting a hierarchy structure used to determine process parameter settings for the process tools to be controlled, which may be accomplished in some embodiments by appropriately selecting a currently relevant hierarchical level during run time on the basis of controller data determined for all items of equal and lower rank in the hierarchy structure. Due to the dynamic adaptation of the hierarchical structure used in the APC algorithm, measurement data may be "exploited" more efficiently, without laborious software changes, for substantially each manufacturing situation encountered in a manufacturing environment.

According to one illustrative embodiment of the present invention, a method comprises establishing a hierarchy structure for an APC algorithm designed to provide a parameter setting for at least one process tool of a specified manufacturing environment, wherein the hierarchy structure includes a plurality of hierarchy levels, with each hierarchy level comprising a plurality of items that are relevant for the manufacturing environment. Moreover, the method comprises determining a parameter setting for each item in each of the hierarchy levels on the basis of measurement data. Finally, a currently relevant hierarchy level is selected on the basis of the determined parameter settings to determine a parameter setting for a specified item in the currently relevant hierarchy level for controlling the at least one process tool.

In a further illustrative embodiment of the present invention, a method comprises establishing an APC algorithm for a specified manufacturing environment, which includes at least one process tool to be controlled on the basis of a parameter setting provided by the APC algorithm, wherein the APC algorithm comprises a hierarchy structure including a plurality of hierarchy levels, each of which in turn comprises one or more items. Moreover, at least one currently relevant hierarchy level is dynamically selected for controlling the at least one process tool, wherein the dynamic selection is performed on the basis of parameter settings determined for at least some items of the hierarchy structure.

BRIEF DESCRIPTION OF THE DRAWINGS

The invention may be understood by reference to the following description taken in conjunction with the accompanying drawings, in which like reference numerals identify like elements, and in which:

FIG. 1b schematically shows the hierarchy structure of the APC algorithm of FIG. 1a;

FIGS. 2b and 2c schematically show examples of two different states of the dynamically adapted hierarchy structure of FIG. 2a.

Figure 1A:
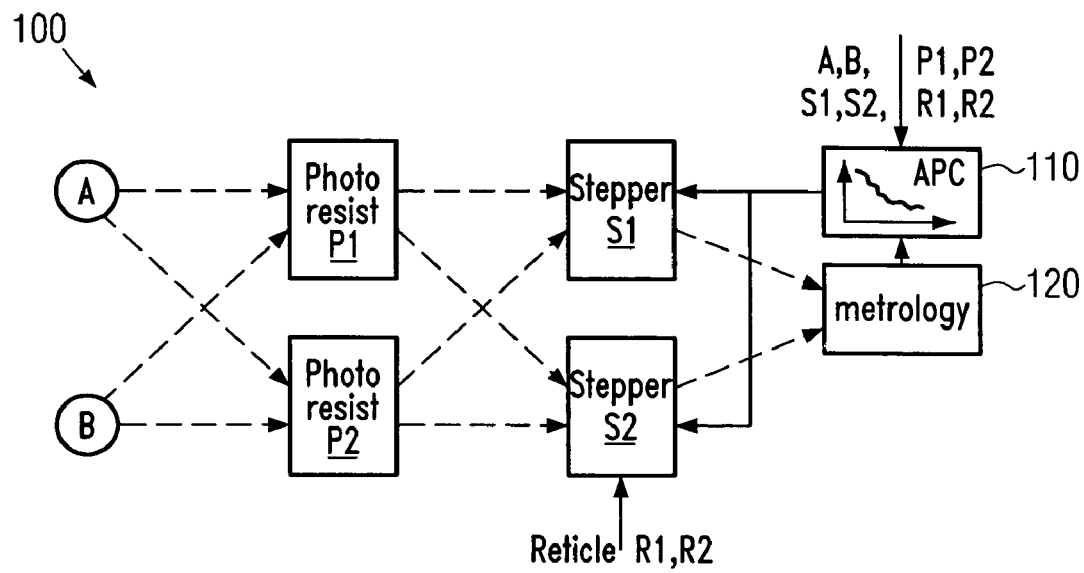
FIG. 1a schematically illustrates a process environment for a lithography process controlled by a prior art APC algorithm with a hierarchy structure.
Figure 1B:
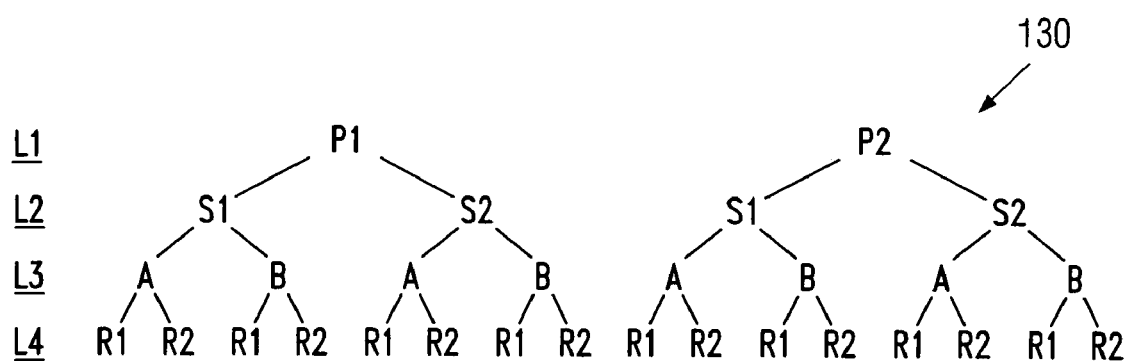

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present invention contemplates a more flexible handling of data created by complex APC algorithms including a hierarchy structure covering many process conditions in that the data of previously processed products may not be unduly divided into a large number of "buckets" despite the many process conditions covered by the hierarchy structure, unless a specified process situation actually requires a correspondingly detailed "resolution" with respect to the various items involved in determining appropriate parameter settings of the process tool to be controlled. Consequently, at the same time, a large number of process situations may be covered by the APC algorithm and its hierarchical structure, without causing any substantial delay and/or without requiring substantial software changes so that even very rare process situations and/or items whose significance on the APC algorithm under consideration may vary over time may be taken into consideration when establishing an effective APC algorithm. Thus, the design engineer of the APC algorithm is given a high degree of flexibility, since any influences, that is, items of the hierarchical structure, that may currently be considered relevant or which may be considered relevant in the future, or which may vary over time, may be taken into consideration without risking a deterioration of control efficiency.

It should be appreciated that in previous examples related to the conventional strategy as well as in illustrative examples of the present invention, it may be referred to specified manufacturing environments, for instance related to lithography processes and processes and items associated therewith, to provide illustrative examples of the principles of the present invention. It should be appreciated, however, that the present invention may also be applied to any process or process sequence requiring sophisticated control mechanisms. For instance, during the formation of metallization layers in sophisticated semiconductor devices, frequently the so-called damascene technique is employed, in which a metal is deposited onto a patterned dielectric layer, wherein, after the deposition, any excess metal has to be reliably removed. Since the removal process, typically comprising a chemical mechanical polishing (CMP) process, and the reliable deposition of metal, such as copper, are per se highly complex processes, an even increased complex situation is encountered, since inherent process non-uniformities of the individual processes may have to be adjusted to accomplish a mutual compensation. To this end, a highly sensitive and reliable process control is required. Hereby, the overall control algorithm may depend on a plurality of items, such as the specific deposition tool used, the electrolyte solution used, specific tool configurations such as diffuser shape and configuration, the status of consumables in individual CMP stations, and the like, wherein situations may occur such as maintenance of a polishing head, replacement of a polishing pad, re-initialization of a plating tool, and the like, which may represent items of a temporary nature, which, however, may at a given time have significant influence on the control algorithm. Thus, even highly complex APC situations may be handled in a very efficient manner by dynamically adapting the complex hierarchy structure.

Figure 2A:
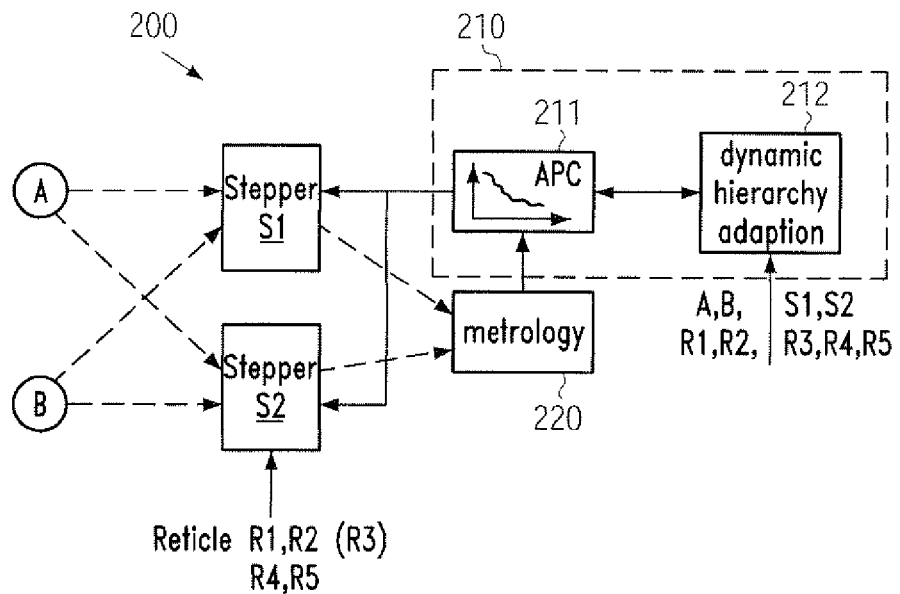
FIG. 2a schematically depicts an exemplary process environment for a lithography process controlled by an APC algorithm with a dynamically adapted hierarchy structure according to illustrative embodiments of the present invention.
Figure 2B:
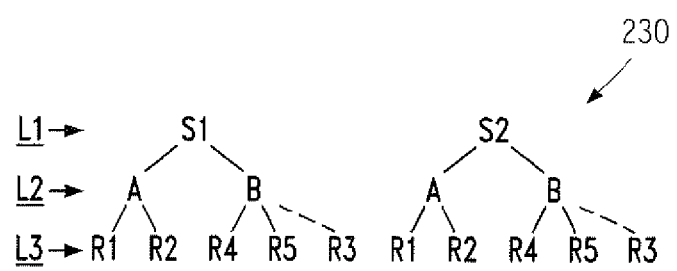
Figure 2C:
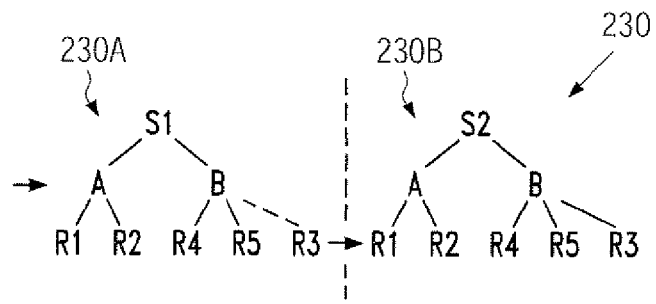

With reference to FIGS. 2a-2c, further illustrative embodiments of the present invention will now be described in more detail. FIG. 2a schematically shows a manufacturing environment 200, wherein, as previously explained, the environment 200 represents any manufacturing environment for fabricating semiconductor devices. For instance, typically a plurality of individual processes of more or less complexity are required for fabricating semiconductor devices, wherein the manufacturing environment 200 may typically represent a specified portion of the entire semiconductor facility. The processes to be performed within the environment 200 are controlled on the basis of an advanced process control (APC) algorithm. In the exemplary embodiment shown in FIG. 2a, the environment 200 may represent a portion of the manufacturing facility, which is designed to form structural elements on substrates by means of photolithography. Thus, in the exemplary environment 200, one or more illustrative process tools, for example, one or more lithography tools S1, S2, which are also referred to as steppers, may be provided.

The one or more process tools S1 and S2 may be operatively connected to a controller 210 comprising a module 211 having implemented therein an advanced process control algorithm designed to provide appropriate parameter settings for the one or more process tools S1 and S2 based on a specific process situation and on metrology data provided by a metrology tool 220 that is operatively connected to the controller 210. A process situation or condition may be considered as the set of individual items having an influence on the processes performed by the process tools S1 and S2, wherein the set of items is arranged in a hierarchy structure, as will be described in more detail below, thereby ranking the influence of the individual items. For instance, an item for the advanced process control algorithm implemented in the module 211 may be the identity of the process tool used, since each process tool S1 and S2 may perform differently, the configuration of the tools S1 and S2, for instance in terms of the reticle used therein, and the like.

The controller 210 further comprises a module 212 having implemented therein an algorithm for a dynamic hierarchy adaptation, which is connected to the module 211 to provide the module 211 with a currently relevant configuration of the hierarchy structure so as to provide appropriate parameter settings for the tools S1 and S2 on the basis of the currently relevant configuration. The modules 211 and 212 may be connected by a bi-directional communication link to allow a bi-directional data exchange. It should be appreciated that the controller 210 comprising the modules 211 and 212 may be implemented in the form of software tools and/or on the basis of dedicated hardware circuitry in combination with appropriate software controlling or running in the dedicated hardware circuitry. Furthermore, the bi-directional data exchange may be performed via any suitable communications system, such as a network, cable connections, wireless channels, and the like, when the module 212 is located remotely to the module 211. Moreover, the module 212 is configured to receive information that specifies the momentary process situation of the environment 200. Corresponding information may be provided, at least partially, directly by the process tools S1 and S2 and/or may be provided by a supervising manufacturing execution system (not shown), which may coordinate the process flow within the manufacturing environment 200.

Moreover, a source of products may be provided in the environment 200, wherein for the sake of convenience only two types of products A, B are illustrated. For instance, the products A and B may represent substantially the same device design except for different speed grades of the circuitry. Consequently, slightly different reticles R1, R2, R3, R4 and R5 may be used in processing the products A, B so as to comply with the slightly different designs. For instance, it may be assumed that the product A may be processed on the basis of reticles R1, R2, while product B may be processed on the basis of reticles R4, R5, wherein optionally a further reticle R3 may be introduced into the process flow for processing products of type B.

Prior to the operation of the controller 210 within the environment 200 according to process strategies controlled by a supervising system (not shown), an appropriate APC algorithm may be established, wherein this APC algorithm allows the determination of appropriate parameter settings for the process tools S1 and S2 on the basis of measurement data and a model of the process to be controlled. Hence, the APC algorithm enables the control of the process tools S1 and S2 on the basis of a moderately low density of measurement data, as obtaining measurement data from each substrate is typically not practical, as is explained above. Establishing an appropriate APC algorithm may be performed on the basis of well-established concepts, wherein the hierarchy structure may be used to identify a plurality of different process situations. A plurality of process situations may be taken into consideration when establishing the hierarchical structure so as to obtain a desired coverage of process conditions. Preferably, substantially all reasonably anticipated process situations may be taken into consideration, which may be considered relevant for any current or future configuration of the environment 200. In the exemplary embodiment depicted in FIG. 2a, all reasonably anticipated items may be introduced in a corresponding hierarchical structure, which may currently be relevant and/or which may gain in relevance in the future and/or which may loose relevance in the future. That is, the reticle R3 is also considered a relevant item for configuring the hierarchical structure of the module 212 such that the APC algorithm of the module 211 may also efficiently perform in process situations in which the reticle R3 is involved.

FIG. 2b schematically shows a hierarchical structure 230 including a plurality of items, which in the embodiment shown may be represented by the same symbols as the corresponding components of the environment 200 and are therefore denoted as S1, S2, A, B, R1, R2, R3, R4 and R5. These items are arranged in accordance with a specified ranking represented by hierarchy levels and describing the degree or assumed degree of influence on the process to be controlled. In the following example, the hierarchy structure 230 may be represented by the three hierarchy levels L1, L2 and L3. For instance, for estimating an appropriate parameter setting for the process tools S1 and S2, that is, in the present example, an appropriate exposure dose, experimental results and/or theoretical models and/or engineering experience may propose that the specifics of the lithography tools used represent the dominant influence on the process and thus the APC algorithm should handle controller data only depending on the process tools, i.e., the items S1 and S2, with highest priority. Thus, the items S1 and S2 may form the uppermost hierarchy level L1 indicating the highest priority when calculating appropriate parameter settings on the basis of the measurement data provided by the metrology tool 220. Similarly, the items A, B may have been identified to be of higher relevance than the influence determined by the choice of the items R1, R2, R3, R4, R5 so that the items A, B may represent the hierarchy level L2 below the level L1. Finally, the lowest and thus least significant hierarchy level L3 may be comprised of the items R1, R2, R3, R4, R5. It should be appreciated that the hierarchical structure 230 is of illustrative nature only, and in many control strategies significantly more complex hierarchical structures including a large number of individual items divided into a plurality of hierarchy levels may be obtained.

During a process flow through the manufacturing environment 200, the controller 210 may be initialized on the basis of currently available data and/or on the basis of other process-related criteria. For convenience, it may be assumed that the controller 210 currently operates "on" the hierarchy level L2 as the currently relevant level for producing parameter settings for products A, B processed in the process tool S1 and S2 while using the reticles R1, R2, R4 and R5. It may be assumed that the reticle R3 is not yet in use. A conventional controller, such as the controller 110 of FIG. 1*a*, would calculate the parameter setting for a substrate of type A to be processed in tool S1 with reticle R1 on the basis of measurement data and controller data, that is, previous parameter settings, associated with that item A on level L2 that is correlated to item S1 and would continue with this concept whenever a substrate of type A is to be processed in tool S1 with reticle R1 or R2, since a fixed relevant hierarchy level L2 indicates that the reticles are not relevant for determining the parameter setting.

Contrary to conventional approaches, in the present invention, the controller 210 searches for changes of the operating conditions by considering, in a particular embodiment, during each run all parameter settings of all those items present in the currently relevant level, i.e., L2, that are correlated with the same item of the level above. That is, in the example shown, the parameter settings of the items A, B are considered, i.e., compared to each other. Also, for any lower-lying hierarchy levels, which are represented in the embodiment shown by the hierarchy level L3, the corresponding stored parameter settings for items emanating from the same item one level below, that is, R1, R2 on the one hand, and R4, R5 and R3 on the other hand are compared with each other. Thus, although the process tools S1 and S2 are operated by using parameter settings obtained by taking into consideration the items of the currently relevant level L2, nevertheless corresponding settings are also considered for all the items in L3 by a comparison process. For example, it is assumed that a comparison between parameter settings for each of the items of the currently relevant hierarchy level L2 reveals that a difference is within a specified tolerance range. Then, the controller 210 determines that distinguishing between the items A and B is not necessary under current operating conditions, since a distinction between the items A and B only results in a difference of the respective parameter settings that are considered negligible. It should be appreciated that the decision on the degree of similarity between the parameter settings may be defined in advance to provide the possibility of controlling the sensitivity of the controller 210 with respect to items within the same hierarchy level. Hence, when the module 212 performing the comparison process between the parameter settings related to the items A and B of L2 assesses the corresponding parameter settings to be "identical," of course within the meaning explained above, the module 212 may update the currently relevant hierarchy level and may switch to one level above, i.e., to the hierarchy level L1, as indicated by the dashed arrow. Consequently, the parameter setting data in subsequent process runs may be obtained on the basis of measurement data associated with level L1, thereby providing a significantly enhanced "utilization" of the metrology data, which convey precious information on the process flow within the manufacturing environment 200. After redefining the currently relevant hierarchy level to L1, the control operation may be continued on the basis of L1, wherein nevertheless corresponding parameter settings for the levels L2 and L3 are considered by comparing correlated items emanating from the same item one level above with each other in order to detect any significant deviations.

For instance, if the process control has been performed on the basis of L1, a comparison in the module 212 may reveal a significant deviation, that is a deviation greater than a specified threshold, between the items A and B of the level L2, and thus the module 212 may switch again to the level L2 as the currently relevant level. Thus, the module 212 dynamically adapts the currently relevant hierarchy level that best fits the current manufacturing conditions. Similarly, when the currently relevant hierarchy level L1 is used and a comparison of the items of the hierarchy level L3 may reveal a significant systematic difference of the parameter settings of some items of L3 emanating from the same item in the above level L2, for instance a significant drift over several process runs may be detected between products A, processed by S1 with reticle R1 and products A, processed by S1 with reticle R2, the module 212 may select level L3 as the new currently relevant hierarchy level, since process conditions have changed and a previously negligible difference between R1 and R2 is now relevant for the controller 210. Hence, even for subtle differences of the comparison results from run-to-run with respect to the level L3, which would be neglected on a run-to-run basis, a corresponding systematic deviation may be identified, for instance, when the difference exceeds a specified threshold. Thus, the controller 210 may be operated on the basis of a dynamically updated hierarchy configuration that dynamically enables reducing or increasing the number of items involved in the control algorithm in accordance with a presently relevant operating condition. It should be appreciated that a delay with respect to the occurrence of a new operating condition or with respect to a substantially continuous change of the operating condition may be adjusted on the basis of the criteria for the comparison results used by the module 212.

As a further example of the mechanism for dynamically adapting the hierarchical structure 230 to the presently valid operating condition, it may now be assumed that the reticle R3 may be introduced into the manufacturing process, wherein, as previously noted, and as indicated in the structure 230, the reticle R3 may be used with products of type B. Contrary to conventional approaches, the hierarchical structure 230 may not be changed, as the item R3 is already part of the structure 230 and the corresponding influence on the APC algorithm is already taken into account. Thus, upon occurrence of a process situation represented by the item R3, an initial corresponding parameter setting may be calculated on the basis of data associated with branches belonging to items R5 and R4, when the currently relevant level is L1, or on the basis of data associated with the branch belonging to item B, when the currently relevant level is L2. If, for instance, the controller 210 operates on the basis of L1 as the currently relevant hierarchical level, and if the metrology data applied to the module 211 identify a significant difference for the exposure dose when reticle R3 is used, compared to the stored data relating to items R4 and/or R5, the controller 210 may switch to L3 as the new currently relevant hierarchical level. In other words, when the control of the steppers S1 and S2 is presently performed on the level L1, since a comparison of the items A and B exhibit substantially identical results for the exposure dose, i.e., the parameter setting, and also no significant difference between correlated items of the level L3 are detected, that is, the exposure dose used for substrates corresponding to item R1 and corresponding to item R2 is substantially the same exposure dose and similarly the items R4 and R5 are operated with substantially identical optimum exposure doses, the level L1 is the appropriate choice. When under this circumstance the products of the type B processed with reticle R3 in stepper S1 may require a significant different optimum exposure dose compared to R4 or R5, the controller 210 recognizes a change in the operating conditions and acknowledges the significant influence of the reticle R3 compared to the reticles R4 and R5 in that it switches to L3, thereby ensuring that corresponding control data are then divided into an appropriate number of "buckets" to take into account the new process condition. Thus, the number of buckets is increased only "on demand," when a significant influence of the item R3 is relevant. For instance, after a certain manufacturing period, the differing behavior of the reticle R3 may increasingly vanish so that the optimum exposure doses required for R3 may substantially become identical to the exposure doses of R4 and R5, the controller 210 may then switch back to L1, assuming that the remaining items may have remained unchanged.

In other embodiments, the currently relevant level may be selected in a "localized" manner to provide even more flexibility in using the hierarchical structure 230 to enhance controller efficiency. For instance, in the example above when the reticle R3 is still different in some way compared to the reticles R4 or R5, those portions of the structure 230 correlated with the item A may be operated by using L2 as the currently relevant level, since the items R1 and R2 may still provide substantially the same optimum exposure dose during the process sequence. Those portions of the structure 230 which relate to the item B may be operated on the basis of L3 as the currently relevant level. Thus, instead of using a single "global" currently relevant hierarchical level, the structure 230 may appropriately be divided into corresponding substructures so as to enhance data efficiency in the controller 210.

FIG. 2c schematically shows an example of a hierarchical structure 230, when divided into, for instance, two substructures (230A, 230B) by the module 212. It may for instance be assumed that the reticle R3 may be used only in the stepper S2 so that a corresponding influence on the optimum exposure dose is obtained only for that portion of the structure 230, indicated as 230b, that is correlated to the stepper S2. Thus, by using the dynamic adaptation algorithm implemented in the module 212, the currently relevant level may be selected as level L3 of the portion 230b, whereas a portion related to the stepper S1 and indicated as 230a may be operated on the basis of an upper level, for instance on level L2 when a significant difference is detected between items A and B of portion 230a, or on the basis of L1, when no significant difference between items A and B of portion 230 is identified by the module 212.

As a result, the present invention provides an improved technique for dynamically adapting a hierarchical structure used in complex APC algorithms so as to select a currently relevant hierarchical level with respect to the current operating conditions. For this purpose, an appropriate hierarchical structure may be established by taking into consideration a plurality of process situations, wherein preferably all or substantially all relevant situations may be integrated. Consequently, the resulting hierarchical structure is "prepared" for any situation without the necessity of reconfiguration of the hierarchical structure. In addition, the adaptation may be performed without substantial delay, compared to conventional approaches, and may in particular be obtained in an automatic fashion without requiring any interaction of an operator. Thus, it may be operated on very detailed hierarchical structures without loss of precious data, since the relevant portions of the structures are only used "on demand" and the number of "buckets" usable for the calculation of appropriate parameter settings is correlated with the current operating conditions so that a high measurement density or a highly detailed hierarchy or any state therebetween is available, as required by the operating conditions. Thus, the invention is highly advantageous in highly complex hierarchies and/or with many items per level and/or with process parameters which might matter but only under certain conditions.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    establishing a hierarchy structure for an APC algorithm designed to provide a parameter setting for a first process tool of a specified manufacturing environment, said hierarchy structure including a plurality of hierarchy levels, each hierarchy level comprising a plurality of items associated with the first process tool;
    determining a parameter setting for each item in each of the hierarchy levels based on measurement data;
    comparing, on a hierarchy level basis, said parameter settings of items of a current hierarchy level with each other to obtain a comparison result; and
    selecting a second hierarchy level above the current hierarchy level for controlling said first process tool based on said determined parameter settings responsive to said comparison result indicating a difference less than a predefined range.

2. The method of claim 1, further comprising selecting a third hierarchy level below said current hierarchy level for controlling said first process tool responsive to said comparison result indicating a difference greater than a predefined threshold in one specific hierarchy level below said current hierarchy level.

3. The method of claim 1, further comprising selecting a third hierarchy level for at least one specified item in a hierarchy level below said second hierarchy level, said third hierarchy level being relevant for all items in said hierarchy structure that are related to said one specified item and said second hierarchy level being relevant for the remaining items.

4. A method, comprising:
    establishing an APC algorithm for a specified manufacturing environment including at least a first process tool and a second process tool to be controlled based on a parameter setting provided by said APC algorithm based on measurement data, said APC algorithm comprising a hierarchy structure comprising a plurality of items arranged in a plurality of hierarchy levels; and dynamically selecting some of the plurality of items at a first hierarchy level for controlling the first process tool and at a second hierarchy level different than the first hierarchy level for controlling the second process tool based on parameter settings determined for said plurality of items for items in levels below the first hierarchy level for the first process tool and items below the second hierarchy level for the second process tool by:

considering a parameter setting for each item in each of the hierarchy levels below the first and second hierarchy levels;

selecting a different hierarchy level for controlling a selected one of the first or second process tools based on said considered parameter settings by comparing, on a level basis, said parameter settings of items of a current hierarchy level associated with the selected process tool and hierarchy levels below said current hierarchy level, which are correlated by said hierarchy structure with one item of a hierarchy level below said current hierarchy level, with each other to obtain a comparison result; and selecting the different hierarchy level to be one level above said current hierarchy level when said comparison result for items of the current hierarchy level indicates a difference that is less than a predefined range.

5. The method of claim 4, wherein, when said comparison result indicates a difference in one specific hierarchy level below said current hierarchy level, said specific hierarchy level is selected as the different hierarchy level.

6. The method of claim 4, further comprising selecting a third hierarchy level for at least one specified item in a hierarchy level below said different hierarchy level, said third hierarchy level being relevant for all items in said lower hierarchy level that are related to said one specified item and said different hierarchy level being relevant for the remaining items.

* * * * *